United States Patent Office 2,991,262
Patented July 4, 1961

2,991,262
MODIFIED SHELLAC COATINGS
Herbert Norris Johnston, Columbus, Ohio, assignor, by mesne assignments, to American Bleached Shellac Manufacturers Association, Inc., New York, N.Y., a corporation of New York
No Drawing. Filed Sept. 18, 1957, Ser. No. 684,637
15 Claims. (Cl. 260—27)

This invention relates to improved shellac coatings and, in particular, to shellac coatings which serve as excellent primer coatings for such substrates as metal and glass.

Heretofore, shellac has not been widely accepted as a primer coating for such substrates as metals and glass, primarily because of its poor adherence and its tendency to absorb water when in contact therewith, resulting in the familiar milky-white water spots. Even in view of these characteristics, shellac continues to find extensive applications for other coating purposes because of its exceptional ability to form very hard coatings, its rapid drying properties, its nonshattering properties, and its attractive light color in the case of bleached shellac.

Because of its desirable properties, shellac has been the object of considerable research for the purpose of extending the uses of shellac. As is true of so many natural products, particularly of animal origin, shellac is a highly complex material. As yet, the exact chemical constitution of shellac remains uncertain. Therefore, the researcher has been handicapped by the fact that the primary object of the research is of uncertain chemical constitution. In view of this, it has been practically impossible to predict with any degree of certainty the results of the various modifications of shellac which are attempted.

Applicant has discovered that shellac can be so modified as to form an excellent wash primer for metal surfaces and even glass surfaces. Applicant has accomplished this by the modification of shellac, while dissolved in an organic solvent, by treatment with solutions of phosphoric acid and chromium trioxide. Phosphoric acid solutions containing chromium trioxide have been used in the pretreatment of metal surfaces for the purpose of improving corrosion resistance of the metal or for providing a surface to which a protective paint will adhere. It is also known to combine such solutions with polyvinyl butyral resins, for example, for the purpose of rendering the polyvinyl butyral suitable as a wash primer. Surprisingly, the mixture of phosphoric acid and chromium trioxide not only improves the ability of the shellac to adhere to the metal surface but it also unexpectedly improves the resistance of the shellac coating towards its susceptibility to water spotting. Although not completely resistant to water spotting, shellac coatings may now be modified solely by reaction with mixtures of phosphoric acid and chromium trioxide, in accordance with this invention, to be sufficiently resistant to water discoloration so that it is now suitable for many commercial applications. For example, shellac coatings modified by the phosphoric acid-chromium trioxide solutions can be obtained which are sufficiently stable toward water discoloration so as to be suitable as a primer coat for aluminum foil. The shellac coating tenaciously adheres to the aluminum foil and provides an excellent base or ground coat for printing inks or other paints. Advantageously the shellac coatings modified with the phosphoric acid-chromium trioxide solutions retain the noncrazing characteristics of unmodified shellac.

Applicant has also discovered that the shellac modified in accordance with this invention when combined with up to about 50 percent conventional polyvinyl butyral wash primer, which itself has been modified with a phosphoric acid-chromium trioxide solution, has further improved resistance against water spotting. In addition, such combination does not exhibit crazing after long exposures in contact with water. Thus, in cases where water discoloration of the primer coat is undesirable, a primer composed of shellac modified with the phosphoric acid-chromium trioxide solutions may be combined with up to about 50 percent of the conventional polyvinyl butyral primer wherein resistance to water discoloration is obtained without crazing, such as has been observed with the conventional polyvinyl butyral primer.

The modified shellac primers of this invention exhibit very good adhesion to a variety of metals, including stainless steel, cold-rolled steel, blue-annealed steel, galvanized steel, magnesium, aluminum plate, and aluminum foil. Excellent adhesion is also obtained on glass surfaces. As compared with conventional polyvinyl butyral wash primers, the shellac wash primer of this invention consisting of shellac modified solely with the phosphoric acids-chromium oxide solutions gives better adherence to aluminum. The adherence decreases slightly when the amount of the conventional polyvinyl butyral primer mixed with the shellac primer of this invention approaches about 50 percent. Salt water immersion tests have indicated that the shellac wash primer of this invention in the absence of any polyvinyl butyral primer has good salt-water resistance, and, in fact, somewhat better salt-water resistance than the conventional polyvinyl butyral wash primer. As indicated above, the shellac wash primer has excellent adherence for top coats of paints or inks. In the variety of top coats tested for adherence to both shellac wash primers and conventional polyvinyl butyral wash primers, the adherence to the shellac wash primer was comparable to the adherence to the polyvinyl butyral wash primer, except for the adherence of alkyd modified nitrocellulose which adhered much better to the shellac primer than to the polyvinyl butyral primer.

In accordance with this invention a solution of phosphoric acid and chromium trioxide is separately prepared and combined with a heated solution of shellac in an organic solvent. Suitable shellac coatings are obtained by heating the mixture at about 45 to 50° C. for a period of about 20 to 30 minutes. Since the direct addition of chromium trioxide to some solvents may result in spontaneous combustion, the chromium trioxide should first be dissolved in water and then combined with a solution of phosphoric acid in an organic solvent. Organic solvents for the phosphoric acid-chromium trioxide combination are known, such solvents being water-miscible and compatible with the solvents for the shellac. In general, ketones and tertiary alcohols are satisfactory solvents for the phosphoric acid and chromium trioxide; in the case of tertiary alcohols, e.g., t-butyl alcohol, the addition of small amounts of water may facilitate the dissolution of the phosphoric acid. Organic, volatile solvents for shellac are well known and, for purposes of this invention, it is preferred that the solvent for the shellac consist, either in whole or in part, of a primary or secondary alcohol. The amount of the solvent, of course, is primarily dictated by the viscosity of the coating desired.

There may be considerable variation between the relative amounts of the phosphoric acid and chromium trioxide combination which is reacted with the shellac. Indications are that there is some difference in degree of resistance to water spotting and adhesion, depending upon the relative proportions of phosphoric acid and chromium trioxide. Thus, in general, adhesion, for example, to aluminum foil, appears to improve as the amount of phosphoric acid exceeds the amount of chromium trioxide. Expressed with reference to a weight ratio between phosphoric acid and chromium trioxide, as the ratio of the amount of phosphoric acid to the amount of chromium trioxide increases, adhesion characteristics of the shellac coating appear to improve. On the other hand, resistance of the coating to water spotting appears to be improved as the amount of chromium trioxide used in the formulation exceeds the amount of the phosphoric acid. However, when the total of the phosphoric acid and chromium trioxide is at a rather high level of concentration (for example, on the order of about 25 percent by weight of the total of the shellac, acid and oxide), and the amount of chromium trioxide is about three times as great as the amount of phosphoric acid, there is a tendency for gelation to occur. Accordingly, it is preferred to avoid the use of excessively large amounts of chromium trioxide in these instances. Satisfactory coatings are obtained with the nonvolatile components within the range of about 1 to 36 percent phosphoric acid, about 0.5 to 25 percent chromium trioxide, and the balance shellac. A highly suitable formulation contains about 7 to 9 percent phosphoric acid (based on 85 percent orthophosphoric acid), 3 to 4 percent chromium trioxide, and the balance shellac.

The following examples will serve to illustrate the invention:

Example 1

About 65.8 parts by weight of refined bleached dewaxed shellac were dissolved in about 373 parts of ethanol, containing about 5 percent water. A second solution was prepared by adding a solution of 2.8 parts by weight of chromium trioxide in 5.6 parts by weight of water to a solution of 6.6 parts by weight of 85 percent orthophosphoric acid in 59.1 parts by weight of acetone. The second solution was added to the shellac solution slowly with stirring and heated for 25 minutes at 45–50° C. After the solution had cooled, it was diluted with about 87 parts of n-butyl alcohol. The solution was stable, clear, green in color, and exhibited relatively constant viscosity, even after long periods of storage. For example, the viscosity after 24 hours was 11.9 sec. at 80° F. (in a No. 4 Ford Cup) and was the same approximately one month later.

Example 2

A conventional polyvinyl butyral primer was prepared following the same procedure as in Example 1, except that polyvinyl butyral was substituted for the shellac. The proportion of polyvinyl butyral to the phosphoric acid and the chromium trioxide was the same and the solvents were the same. The measured viscosity of this primer at 80° F. (No. 4 Ford Cup) after one hour was 68.0 sec., after 18 hours the viscosity was 52.2 sec., and after approximately 1 month storage was 32.8 sec.

Example 3

A combination of the shellac primer of Example 1 with the polyvinyl butyral primer of Example 2 was prepared consisting of about 25 percent by weight of the shellac wash primer and 75 percent by weight of the polyvinyl butyral wash primer. The shellac and polyvinyl butyral wash primer were easily mixed together to form a uniform, homogeneous mixture.

Example 4

Equal parts by weight of the shellac wash primer of Example 1 and the polyvinyl butyral wash primer of Example 2 were mixed together to form a mixture containing 50 percent each by weight of the wash primers of Examples 1 and 2.

Example 5

A combination of the shellac primer of Example 1 with the polyvinyl butyral wash primer of Example 2 was prepared consisting of about 75 percent by weight of the shellac wash primer and about 25 percent by weight of the polyvinyl butyral wash primer. The shellac and polyvinyl butyral wash primer were easily mixed together to form a uniform, homogeneous mixture.

Example 6

A primer was prepared in the same manner as the primer of Example 1 with all the components in the same amounts, except that 2.3 parts by weight of the orthophosphoric acid and 20.3 parts by weight of the acetone were used.

Example 7

A primer was prepared in the same manner as the primer of Example 1 except that the second solution, on a weight basis, consisted of 6.6 parts of chromium trioxide, 2.8 parts of phosphoric acid, 19.7 parts of water, and 25.1 parts of acetone.

Example 8

A primer was prepared in the same manner as the primer of Example 1 except that the second solution, on a weight basis, consisted of 0.5 part of chromium trioxide, 2.4 parts of phosphoric acid, 1.5 parts of water, and 21.1 parts of acetone.

The following tests illustrate the relative adhesion properties of these films to metal and also the improvement in the water resistance in the shellac wash primers. In order to eliminate any difference in adhesion due to the thickness of the films, films of uniform thickness were drawn down on aluminum foil. All of the films were permitted to dry for at least about 15 minutes. The adhesiveness of the film for the substrate was tested by applying pressure-sensitive tape down over the film. The tape was then rapidly pulled away from the film. Several areas of each film were tested in this manner. The shellac wash primer of Example 1 displayed no loss of adhesion. In testing the polyvinyl butyral wash primer of Example 2, parts of the film, up to one half of the film covered by the tape, was removed. In the cases of the combination of the wash primers of Examples 3 to 5 spotty removal of the film began to occur when the wash primer consisted of about 50 percent of the polyvinyl butyral wash primer. Examples 6, 7, and 8 illustrate the shellac primers with different relative proportions of the phosphoric acid and chromium trioxide and the effect of these changes on the adhesion and resistance to water spotting of the primer. The degree of adhesion of the primers is tabulated in the table below. The degree of adhesion in the table is indicated by a numerical rating wherein a rating of 1 indicates no removal of the film, the numeral 2 indicates spotty removal, numeral 3 indicates partial removal up to about one half of the film under the tape, and the numeral 4 indicates complete or substantially complete removal of the film. For purposes of comparison the degree of adhesion of a film of refined bleached shellac, but not treated in accordance with this invention, is also shown in the table.

The resistance of the films toward water spotting or water discoloration is also shown in the table. In conducting these tests, each of the wash primers of the examples was drawn down on glass plates to obtain a film of uniform thickness. The glass plates were placed on "Morest" hiding power charts and 10 drops of deionized water were placed on each of the films. These test areas were covered with watch glasses in order to prevent evaporation of the water. The test areas were visually inspected at periodic intervals, as indicated in the table, to determine the degree of resistance to water spotting or discoloration. Again for purposes of comparison, a film of refined bleached shellac was tested in the same manner for water spotting.

As indicated in the table, the areas of the polyvinyl butyral wash primer of Example 2 which were in contact with the drops of water became crazed. The amount of crazing was decreased by the addition of the shellac wash primer to the polyvinyl butyral primer. Complete elimination of the crazing is possible in combinations containing about 50 percent of the shellac wash primer with the polyvinyl butyral wash primer.

| Wash Primer | Degree of Adhesion | Water Spot Test | | | | | | |
|---|---|---|---|---|---|---|---|---|
| | | ½ hr. | 1 hr. | 2 hr. | 6 hr. | 8 hr. | 30 hr. | After Drying |
| Shellac | 4 | m | m | v.m. | v.m. | v.m. | v.m. | No craze. |
| Example 1—Shellac Primer | 1 | n | v.s. | s | s | s+ | s+ | Do. |
| Example 2—P.V.B. Primer | 3 | n | n | n | n | n | n | Crazed. |
| Example 3 (25–75) | 3 | n | n | n | n | n | n | Slightly Crazed. |
| Example 4 (50–50) | 1–2 | n | n | n | n | n | n | No Craze. |
| Example 5 (75–25) | 1 | n | n | n | n | n | n | Do. |
| Example 6 | 4 | n | n | v.s. | s+ | -------- | m | Do. |
| Example 7 | 4 | n | n | n | n | -------- | n | Do. |
| Example 8 | 1 | s+ | m | m | m+ | -------- | v.m. | Do. |

Code: s=slight; v=very; m=milky; n=none.

*Example 9*

Pigmented modified shellac wash primers were prepared as follows: 20 parts by weight of a pigment mixture were added to 100 parts by weight of a primer prepared in the same manner as the primer of Example 1. The pigment mixture contained 14 percent by weight of magnesium silicate talc, as sold under the name of "Asbestine 3X" by the International Pulp Company, New York, New York, and 86 percent by weight of strontium chromate. The primer containing the added pigment mixture was ball milled in a ceramic ball mill at room temperature for 20 hours. After ball milling, there was obtained from the mill a greenish-gray, low viscosity grind that appeared to be well dispersed. Portions of this grind were then added to and mixed with modified shellac wash primers to obtain pigmented modified shellac wash primers.

A first pigmented modified shellac wash primer was prepared by mixing 60 parts by weight of the grind, prepared as described, and 50 parts by weight of a primer prepared in the same manner as the primer of Example 1.

A second pigmented modified shellac wash primer was prepared by mixing 30 parts by weight of the grind, prepared as described, and 50 parts by weight of a primer prepared in the same manner as the primer of Example 1.

The degree of adhesion of a film of each of the pigmented modified shellac wash primers to aluminum foil was measured in the same manner and by the same procedure as described aforehand for measuring the degree of adhesion of films of the primers of the preceding examples. The film of the first pigmented shellac wash primer had a degree of adhesion of 2 with only spotty removal of the film, and the film of the second pigmented shellac wash primer had a degree of adhesion of 1 with no removal of the film.

It is within the scope of this invention that materials, such as pigments and pigment mixtures, may be included in the modified shellac wash primers of the invention. Barium chromate has been found to be satisfactory for preparation of pigmented modified shellac wash primers of the invention.

The shellac wash primer of this invention exhibits excellent top-coat adherence. Top coats of the following types were applied over films of the shellac wash primer of Example 1 and also over films of the conventional polyvinyl butyral wash primer of Example 2. These top coats applied to the wash primers were as follows: an alkyd modified nitrocellulose lacquer (MIL-L-7178 lacquer); a top coat of vinyl chloride-vinyl acetate copolymer (Bakelite Vinylite VAGH); a top coat of a copolymer of methyl acrylate and ethyl methacrylate (Acryloid B-72); a top coat of a drying oil-modified phthalic-alkyd type resin (TT-E-485b Enamel); and an oleoresinous coating. The top coat adherence was tested by pressing strips of pressure-sensitive adhesive tape down on the surface of the dried top coat. The strips of tape were then rapidly pulled off of the top coat. In all cases, there was no removal of the top coat from either of the wash primers, except in the case of the nitrocellulose lacquer on the polyvinyl butyral wash primer of Example 2. The nitrocellulose top coat could be ripped off of the polyvinyl butyral wash primer by the pressure-sensitive tape. The nitrocellulose lacquer was not removed by the pressure-sensitive tape from the shellac wash primer.

Surprisingly, the shellac wash primers of this invention, when top-coated with a vinyl chloride-vinyl acetate copolymer type coating, exhibited resistance to salt-water immersion, even somewhat better than the conventional polyvinyl butyral wash primer under similar conditions. This has been indicated by conducting salt-water immersion tests on panels of cold-rolled steel which were coated with the shellac wash primer of Example 1; cold-rolled steel panels which were coated with the conventional polyvinyl butyral wash primer of Example 2; and cold-rolled steel panels which were coated with the combination shellac-polyvinyl butyral wash primer of Example 4. Over each of these coatings an aluminum pigmented vinyl chloride-vinyl acetate copolymer top coat was applied. The coatings were air-dried. The coatings were scratched down through to the bare metal. The coated steel panels were then immersed in an aqueous 20 percent salt solution at 95° F. for a three-week period. Upon removal of the panels from the salt solution, the conventional polyvinyl butyral coated panel exhibited excessive peeling around the area of the scratch marks. The panel coated with the combination primer of Example 4 showed less peeling. The panel coated with the shellac wash primer of Example 1 showed substantially less peeling than the panel coated with the polyvinyl butyral wash primer.

As various embodiments could be made in the invention described herein and since many different changes can be made in the embodiments set forth, it is to be understood that all material disclosed is to be interpreted as illustrative and not in a limiting sense.

What is claimed is:

1. A modified shellac wash primer characterized by its ability to provide a base coating for painting thereover, the base coating having improved resistance to water spotting over that of unmodified shellac and further characterized by good adhesion to metals and glass, the primer comprising: a reaction product of mixing a solution of shellac in an organic solvent with a solution of phosphoric acid and chromium trioxide in the proportions for the total amount of shellac, phosphoric acid, and chromium trioxide of about 1 to 36 percent by weight phosphoric acid, 0.5 to 25 percent by weight chromium trioxide, and the balance shellac.

2. A base coating of the primer of claim 1 after drying.

3. In combination, a metal base and a base coating of the primer of claim 1 applied to said base and dried.

4. A modified shellac wash primer in accordance with claim 1 containing in admixture therewith up to about 50 percent by weight of a polyvinyl butyral wash primer comprising a solution in an organic solvent of polyvinyl butyral which has been reacted with a minor amount of chromium trioxide and a major amount of phosphoric acid based on the total amount of polyvinyl butyral, chromium trioxide, and phosphoric acid.

5. A base coating of the primer of claim 4 after drying.

6. In combination, a metal base and a base coating of the primer of claim 4 applied to said base and dried.

7. A modified shellac wash primer characterized by its ability to provide a base coating for painting thereover, the base coating having improved resistance to water spotting over that of unmodified shellac and further characterized by good adhesion to metals and glass, the primer comprising: a reaction product of mixing a solution of shellac in an organic solvent with a solution of phosphoric acid and chromium trioxide in the proportions for the total amount of shellac, phosphoric acid, and chromium trioxide of about 7 to 9 percent by weight phosphoric acid, 3 to 4 percent by weight chromium trioxide, and the balance shellac, and of heating the resulting mixture of solutions to 45 to 50° C. for 20 to 30 minutes.

8. A base coating of the primer of claim 7 after drying.

9. In combination, a metal base and a base coating of the primer of claim 7 applied to said base and dried.

10. A modified shellac wash primer in accordance with claim 7 containing in admixture therewith up to about 50 percent by weight of a polyvinyl butyral wash primer comprising a solution in an organic solvent of polyvinyl butyral which has been reacted with a minor amount of chromium trioxide and a major amount of phosphoric acid based on the total amount of polyvinyl butyral, chromium trioxide and phosphoric acid.

11. A base coating of the primer of claim 10 after drying.

12. In combination, a metal base and a base coating of the primer of claim 10 applied to said base and dried.

13. In a process for preparation of a modified shellac wash primer, the steps of: mixing a solution of shellac in an organic solvent with a solution of phosphoric acid and chromium trioxide in the proportions for the total amount of shellac, phosphoric acid, and chromium trioxide of about 1 to 36 percent by weight phosphoric acid, 0.5 to 25 percent by weight chromium trioxide, and the balance shellac; and heating the resulting mixture of solutions to a temperature of 45 to 50° C. for 20 to 30 minutes.

14. The process of claim 13 in which the sum of the amounts of phosphoric acid and chromium trioxide is less than 25 percent by weight of said total amount and the amount of chromium trioxide is less than three times the amount of phosphoric acid.

15. In a process for preparation of a modified shellac wash primer, the steps of: mixing a solution of shellac in an organic solvent with a solution of phosphoric acid and chromium trioxide in the proportions for the total amount of shellac, phosphoric acid, and chromium trioxide of about 7 to 9 percent by weight phosphoric acid, 3 to 4 percent by weight chromium trioxide, and the balance shellac; and heating the resulting mixture of solutions to a temperature of 45 to 50° C. for 20 to 30 minutes.

References Cited in the file of this patent

UNITED STATES PATENTS

| | | |
|---|---|---|
| 1,918,804 | Gardner | July 18, 1933 |
| 1,925,208 | Schladebach et al. | Sept. 5, 1933 |
| 2,425,023 | Bassford | Aug. 5, 1947 |
| 2,488,651 | Whiting et al. | Nov. 22, 1949 |